(12) United States Patent
Ertlmeier et al.

(10) Patent No.: US 12,109,908 B2
(45) Date of Patent: Oct. 8, 2024

(54) ELECTRIFIED MOTOR VEHICLE WITH A DISPLAY UNIT FOR DISPLAYING AT LEAST ONE RESIDUAL RANGE

(71) Applicant: Bayerische Motoren Werke Aktiengesellschaft, Munich (DE)

(72) Inventors: Andreas Ertlmeier, Wolnzach (DE); Hajo Meinert, Munich (DE); Julian Wiesmeier, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 403 days.

(21) Appl. No.: 17/594,332

(22) PCT Filed: May 27, 2020

(86) PCT No.: PCT/EP2020/064618
§ 371 (c)(1),
(2) Date: Oct. 12, 2021

(87) PCT Pub. No.: WO2020/259941
PCT Pub. Date: Dec. 30, 2020

(65) Prior Publication Data
US 2022/0176848 A1 Jun. 9, 2022

(30) Foreign Application Priority Data
Jun. 27, 2019 (DE) .................. 10 2019 117 390.6

(51) Int. Cl.
*B60L 58/12* (2019.01)
*B60K 35/28* (2024.01)
*B60K 35/60* (2024.01)

(52) U.S. Cl.
CPC .............. *B60L 58/12* (2019.02); *B60K 35/60* (2024.01); *B60K 35/28* (2024.01); *B60K 2360/169* (2024.01); *B60L 2260/52* (2013.01)

(58) Field of Classification Search
None
See application file for complete search history.

(56) References Cited

U.S. PATENT DOCUMENTS 5,598,087 A * 1/1997 Hara .................... G01R 31/379
324/435
2012/0116606 A1 5/2012 Ichinokawa
(Continued)

FOREIGN PATENT DOCUMENTS

CA 2 221 768 C 10/1997
CN 103419787 A 12/2013
(Continued)

OTHER PUBLICATIONS

International Search Report (PCT/ISA/210) issued in PCT Application No. PCT/EP2020/064618 dated Sep. 7, 2020 with English translation (five (5) pages).
(Continued)

*Primary Examiner* — Raymond L Nimox
(74) *Attorney, Agent, or Firm* — Crowell & Moring LLP

(57) ABSTRACT

An electrified motor vehicle includes a display unit for displaying at least one residual range, a high-voltage accumulator, and at least one electronic control unit which determines an expected minimum range on the basis of the state of charge of the high-voltage accumulator and which determines, on the basis of the temperature of the high-voltage accumulator and the state of charge of the high-voltage accumulator, a temperature-dependent bonus range which is displayed instead of the minimum range if the minimum range has dropped to zero.

7 Claims, 4 Drawing Sheets

(56) References Cited

U.S. PATENT DOCUMENTS

| | | |
|---|---|---|
| 2013/0311016 A1 | 11/2013 | Kim |
| 2014/0074329 A1 | 3/2014 | Yang et al. |
| 2014/0095060 A1 | 4/2014 | Heo et al. |
| 2014/0214301 A1 | 7/2014 | Edgren |
| 2018/0080995 A1* | 3/2018 | Heinen .................. G01R 31/44 |
| 2018/0264967 A1 | 9/2018 | Damjanovic et al. |
| 2020/0286305 A1* | 9/2020 | Diamond .......... B60W 50/0205 |

FOREIGN PATENT DOCUMENTS

| | | |
|---|---|---|
| CN | 103713262 A | 4/2014 |
| CN | 103963648 A | 8/2014 |
| CN | 108136912 A | 6/2018 |
| DE | 196 12 062 B4 | 4/2007 |
| DE | 10 2009 039 092 A1 | 3/2011 |
| DE | 10 2012 214 962 A1 | 11/2013 |
| DE | 10 2015 222 795 A1 | 5/2017 |
| WO | WO 97/36152 A1 | 10/1997 |

OTHER PUBLICATIONS

German-language Written Opinion (PCT/ISA/237) issued in PCT Application No. PCT/EP2020/064618 dated Sep. 7, 2020 (five (5) pages).

German-language Search Report issued in German Application No. 10 2019 117 390.6 dated Sep. 29, 2021 with partial English translation (13 pages).

Chinese-language Office Action issued in Chinese Application No. 202080028430.8 dated Dec. 9, 2023 with English translation (15 pages).

\* cited by examiner

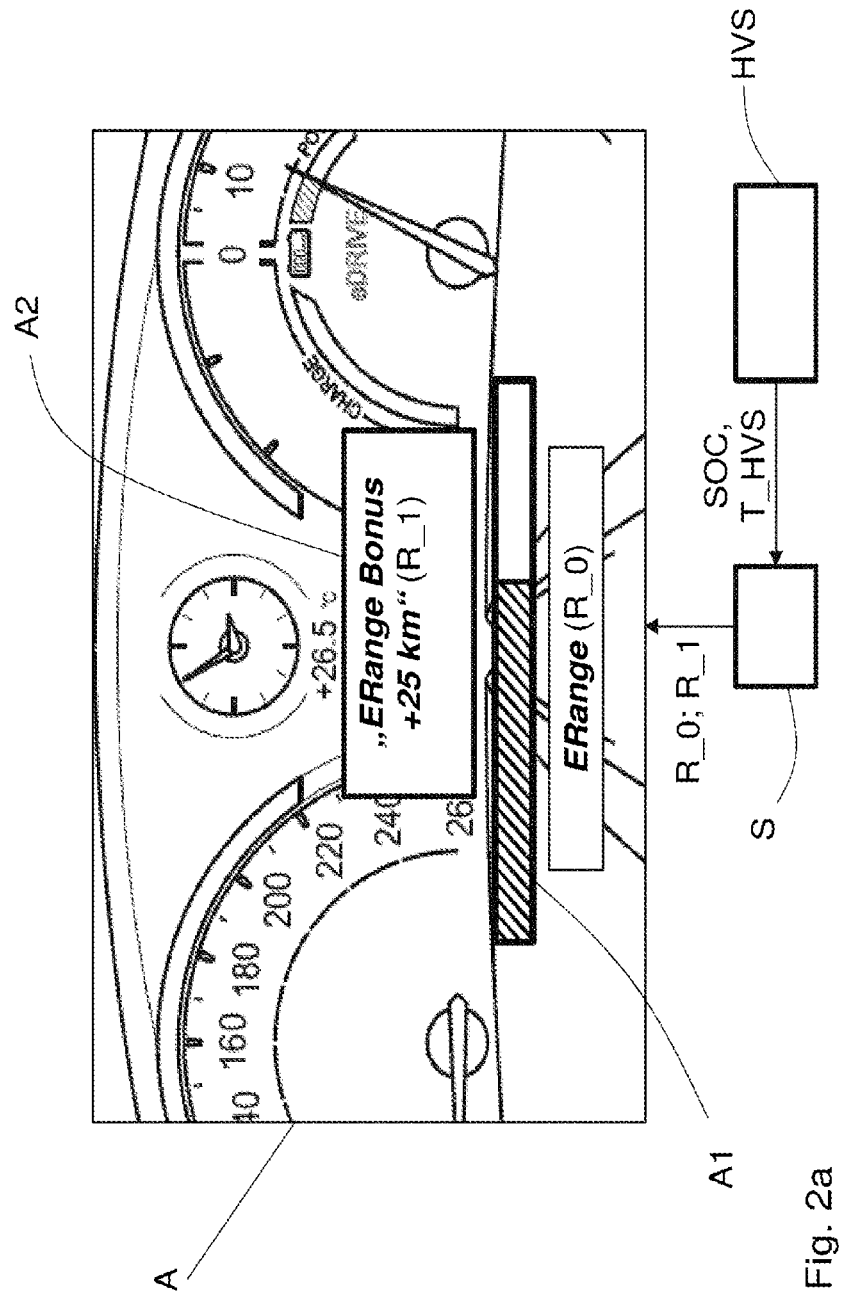

ELECTRIFIED MOTOR VEHICLE WITH A DISPLAY UNIT FOR DISPLAYING AT LEAST ONE RESIDUAL RANGE

BACKGROUND AND SUMMARY OF THE INVENTION

The invention relates to an electrified motor vehicle, in particular a pure electric vehicle, with a display unit for displaying at least one residual range.

A plurality of apparatuses and methods for determining and displaying residual ranges in motor vehicles, in particular also in electric vehicles and/or hybrid vehicles, are already known. The term "residual range" is also referred to in abbreviated form as "range" below.

A basic residual range which results from the ratio of the current tank or energy store contents to the current fuel or energy consumption is currently determined in virtually every vehicle and is displayed, for example, as part of an on-board computer function or in the combination instrument.

DE 196 12 062 B4 discloses a display unit for data dependent on the energy consumption of a vehicle, wherein a range of residual ranges, which is determined on the basis of the amount of energy currently contained in the energy store taking into account different driving styles and different driving conditions, is displayed instead of a residual range value. The limits of the range can be determined taking into account different driving styles and different driving conditions of a vehicle-specific and possibly a driver-specific consumption spectrum. The displayed range of residual ranges can be empirically adapted by evaluating the individual driving behavior of the driver over a particular period.

For example, DE 10 2009 039 092 A1 discloses a method for determining at least two different defined residual ranges such that their display makes it possible for the driver to quickly recognize whether his driving style is energy-efficient or how great the difference is between his driving style and an energy-efficient driving style.

Furthermore, DE 10 2015 222 795 A1 discloses a display unit for displaying at least one residual range in a motor vehicle depending on the energy reserve of at least one drive system (for example tank contents in the case of an internal combustion engine drive and/or high-voltage battery state of charge in the case of an electromotive drive), wherein the display of the residual range can be hidden despite an available energy reserve if at least one defined operating condition is present. A defined operating condition can preferably indicate at least a temporary unavailability of a unit of the drive system (for example drive system with electric motor, drive system with internal combustion engine, drive system with fuel cell, etc.).

The object of the invention is to functionally expand a display system for displaying the residual range of an electrified motor vehicle and to increase the usable range, in particular in a pure electric vehicle.

This object is achieved according to the claimed invention.

The invention relates to an electrified motor vehicle with a display unit for displaying at least one residual range, with a high-voltage accumulator and with at least one electronic control unit which determines an expected minimum range on the basis of the state of charge of the high-voltage accumulator and determines a temperature-dependent bonus range on the basis of the temperature of the high-voltage accumulator and the state of charge of the high-voltage accumulator, which bonus range is displayed instead of the minimum range if the minimum range has fallen to zero.

The invention is based on the following considerations and knowledge:

The high-voltage accumulator is the most expensive component in a vehicle. Every gained kilometer of range is relevant. An optimized function makes it possible for the driver to have improved use of the component.

PRIOR ART

A high-voltage accumulator heats up in the case of high loads such as a freeway journey and fast charging.

A warm high-voltage accumulator may be discharged to a lower state of charge (SOC) than a cold high-voltage accumulator.

Current high-voltage accumulators use a margin in order to be able to still provide the driver with a range after switch-off.

A high-voltage accumulator may possibly no longer be started up after a switching-off process if it becomes cooler after switch-off.

The prior art is explained in more detail in connection with FIG. 3. FIG. 3 schematically shows a display strategy according to the prior art, wherein the high-voltage accumulator temperature T_HVS is plotted on the x axis and the high-voltage accumulator state of charge SOC is plotted on the y axis.

During long-distance operation, in particular of a pure electric vehicle, the entire available energy cannot be released to the driver as a displayed certain range for reasons of tolerance errors and safety. Only a minimum range R_0 which can certainly be achieved is displayed as the approved range with a margin. After the approved range R_0 of "0 km" has been displayed on the display, the driver does not have any transparency as regards how much range he actually still has.

After reaching the 0 km range display until the definitive end of the journey F_end, an electric vehicle continues to be operated in the so-called "Turtle mode" TM without a range display or with the approved range R_0=km.

At "normal" operating temperatures (for instance T_HVS>10° C.), a constant predefined minimum battery state of charge (SOC_min) is used to prevent a loss of range as a result of cooling.

Additionally usable energy is not displayed to the driver.

The display of the end of a journey by displaying the approved range R_0=0 km is generally effected earlier than necessary since the actual end of the journey F_end has possibly not yet been reached.

Basic Concept of the Invention

If, as a result of a corresponding driving style which increases the high-voltage accumulator temperature, the driver reaches an optimization range (BM; FIG. 1) in which an additional range ("ERange Bonus") going beyond the "normal" maximum approved range ("ERange") can be approved as a result of an increased high-voltage accumulator temperature (T_HVS), the driver is provided with this via a further or alternative display, for example "ERange Bonus+25 km" in the combination instrument. Advice which requests the driver to charge the accumulator when switching off in this optimization range is then preferably given, at least if cooling of the high-voltage accumulator is expected after switch-off. The display of the additional range from the optimization range preferably usually expires after the vehicle has been switched off.

In Other Words

With an appropriate driving style, the driver receives a bonus range which is displayed to him.

The range is continuously increased or reduced during the journey depending on the driving style which influences the high-voltage accumulator temperature and/or a boundary condition.

After reaching the 0 km display in the conventional range display, the bonus range for electrical driving is superimposed instead or additionally displayed.

The invention is surprising in that, although, for example, a plurality of journeys in succession reduce the state of charge (SOC) of the high-voltage accumulator, they can nevertheless lead to an increasing actual range by virtue of the resulting heating of the high-voltage accumulator. In particular, at a starting temperature of approximately 25°, a range can be considerably increased by a further temperature increase of the high-voltage accumulator. When switching off the vehicle, a weather report can be proactively requested and can be used to determine the expected cooling of the battery. On the basis of this, a request indicating that external charging is recommended in the case of expected low temperatures may be given to the driver when switching off the vehicle.

Advantages

The driver can benefit from an additional range of up to 8% during long-distance operation.

As a result of the direct transparency, the driver can optimize his driving style in order to achieve an optimum range.

An exemplary embodiment of the invention is illustrated on the basis of the drawings.

BRIEF DESCRIPTION OF THE DRAWINGS

FIG. 2a shows an additional bonus range display if the approved range has not yet been used up.

DETAILED DESCRIPTION OF THE DRAWINGS

Figure 1:
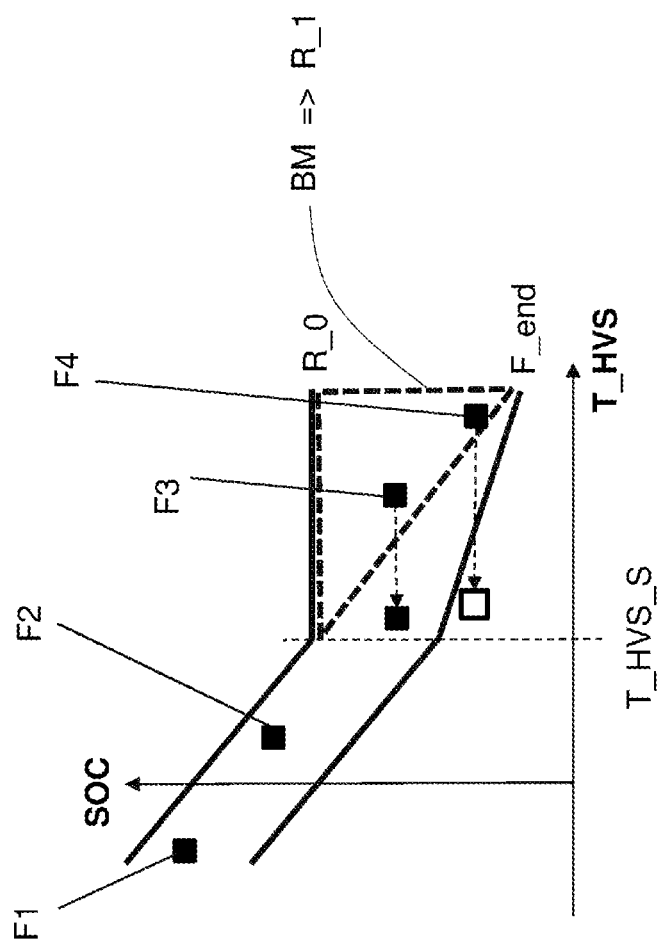
FIG. 1 schematically shows the display strategy according to an exemplary embodiment of the invention which has been modified in comparison with the display strategy according to the prior art.

FIG. 1 schematically shows determination of an expected minimum range on the basis of the state of charge SOC of the high-voltage accumulator, which can be displayed as an approved range R_0. This determination is at least partly independent of the high-voltage accumulator temperature T_HVS, that is to say here above a particular high-voltage accumulator temperature T_HVS_S. In an optimization range BM above the particular high-voltage accumulator temperature T_HVS_S, a temperature-dependent bonus range R_1 is additionally determined on the basis of the temperature T_HVS of the high-voltage accumulator and the state of charge SOC of the high-voltage accumulator. This bonus range R_1 is displayed in the optimization range BM.

Figure 2B:
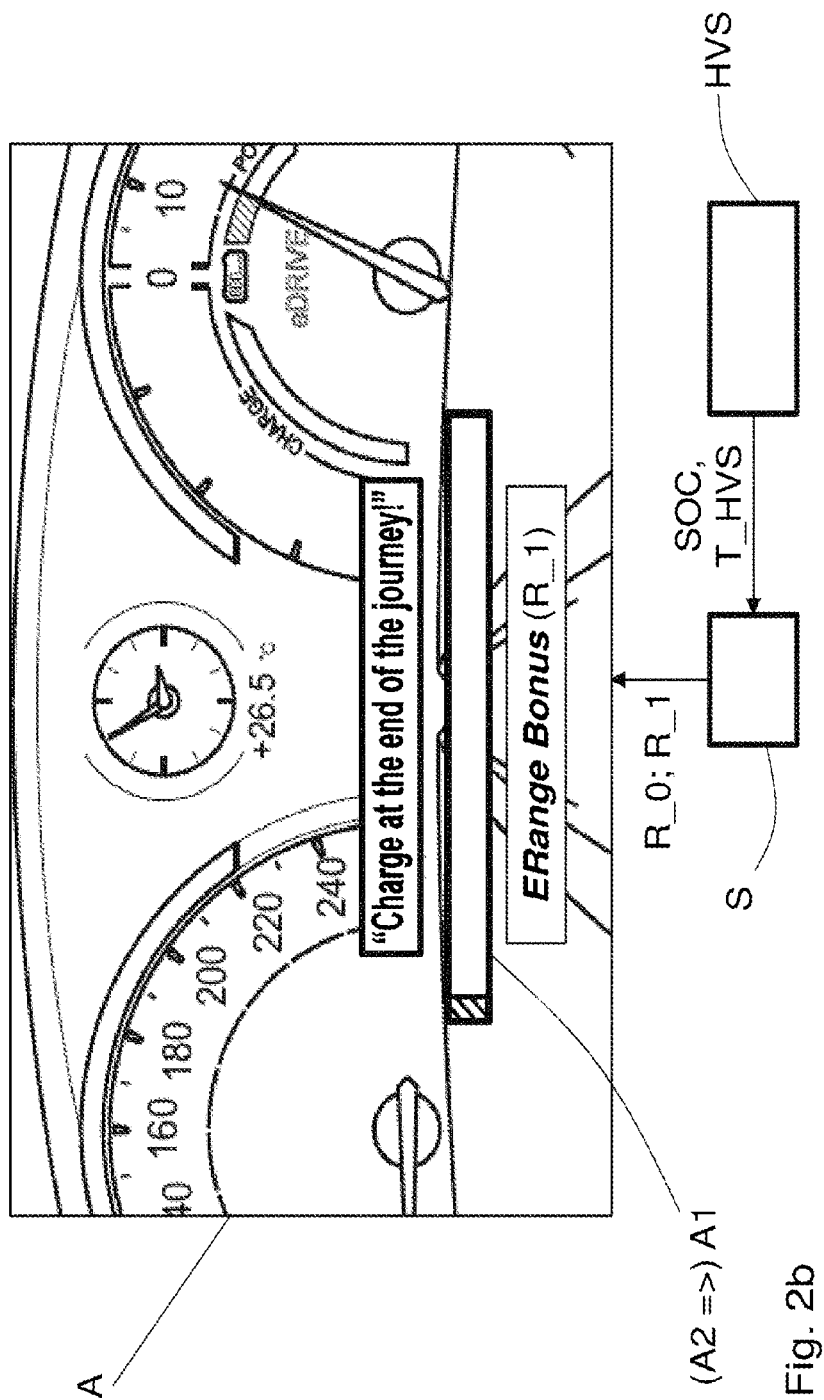
FIG. 2b shows an alternative bonus range display if the approved range has been used up.
Figure 3:
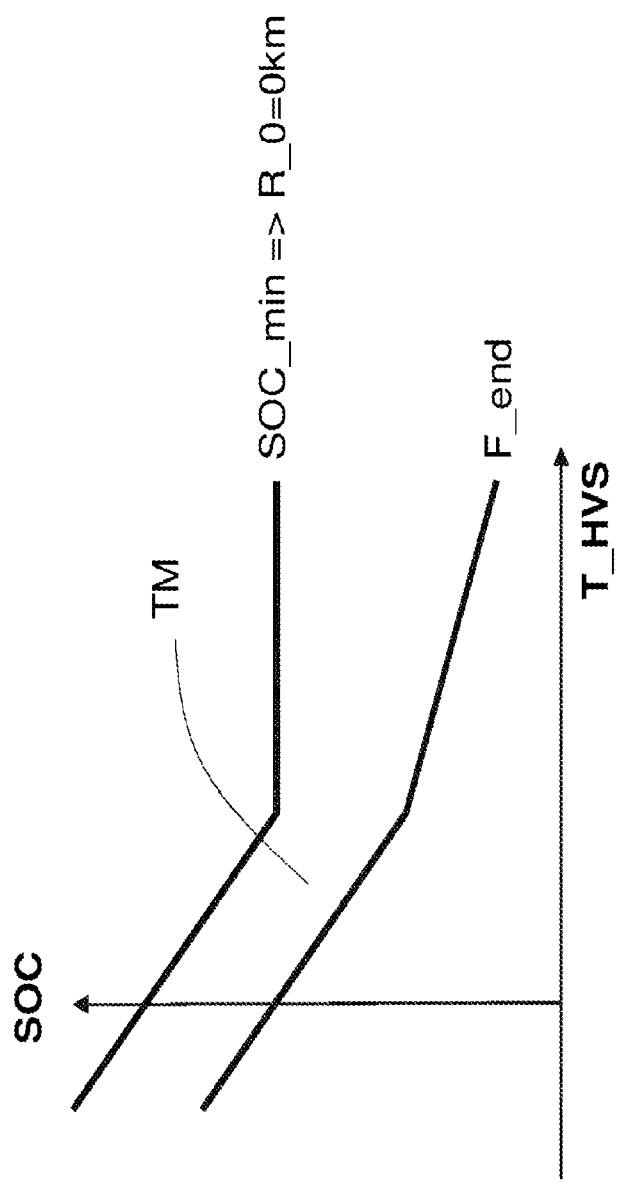
FIG. 3 schematically shows a display strategy according to the prior art.

FIGS. 2a and 2b show the components which are most important for the electrified motor vehicle according to an exemplary embodiment of the invention: a display unit A in the form of a combination instrument with two display regions A1 and A2, a high-voltage accumulator HVS and an electronic control unit S which may simultaneously be the drive motor control device. The control unit S determines the approved range R_0 and the temperature-dependent bonus range R_1, as described above.

In FIG. 2a, the bonus range R_1 is displayed in the display region A2 in addition to the minimum range R_0 if the minimum range R_0 has not yet fallen to 0 km, as displayed in the display region A1.

In FIG. 2b, the bonus range R_1 is displayed in the display region A1 instead of the minimum range R_0 if the minimum range R_0 has fallen to 0 km.

Furthermore, in addition to the bonus range R_1, a request is output in FIG. 2b indicating that external charging should be carried out when the vehicle is next switched off. In this case, this request may always be made, in a first alternative, if the minimum range R_0 is zero or, in a second alternative, only when cooling of the high-voltage accumulator to a temperature which means that it is no longer possible to start the electric vehicle is predetermined after the vehicle has been switched off. This predetermination of the temperature may be carried out, for example, by coupling the control unit S to an electronic weather report. FIG. 1 illustrates, by way of example, the temperature-dependent state of charge SOC after each of four journeys F1 to F4. After the journey F3, a first situation is illustrated in which, despite cooling of the high-voltage accumulator HVS after the motor vehicle has been switched off, a start is possible. After the journey F4, a second situation is illustrated in which, despite cooling of the high-voltage accumulator HVS after the motor vehicle has been switched off, a start is no longer possible. The request for charging after the end of the journey according to FIG. 2b would therefore be made at least after the journey F4.

In a first alternative, the display of the bonus range R_1 is preferably always reset when the vehicle is switched off. In a second alternative, the display of the bonus range R_1 can preferably be reset only when restarting the vehicle if the temperature T_HVS of the high-voltage accumulator HVS is lower during the restart than during the previous switching off of the vehicle.

What is claimed is:

1. An electrified motor vehicle comprising:
   a display unit for displaying at least one residual range;
   a high-voltage accumulator; and
   at least one electronic control unit which determines an expected minimum range based on a state of charge of the high-voltage accumulator and which determines a temperature-dependent bonus range based on a temperature of the high-voltage accumulator and the state of charge of the high-voltage accumulator,
   wherein the bonus range is determined as an addition to the minimum range, and
   wherein the bonus range is displayed instead of the minimum range if the minimum range has fallen to zero.

2. The electrified motor vehicle according to claim 1, wherein
   the bonus range is displayed in addition to the minimum range if the minimum range has not yet fallen to zero.

3. The electrified motor vehicle according to claim 1, wherein in addition to the bonus range, a request to externally charge the vehicle is displayed when the vehicle is next switched off if the minimum range has fallen to zero.

4. The electrified motor vehicle according to claim 1, wherein in addition to the bonus range, a request to externally charge the vehicle is displayed when the vehicle is next switched off only if the minimum range has fallen to zero and, after switching off the vehicle, cooling of the high-voltage accumulator to a temperature which means that it is no longer possible to start the electric vehicle is predetermined.

5. The electrified motor vehicle according to claim 1, wherein the bonus range is reset when switching off the vehicle.

6. The electrified motor vehicle according to claim 1, wherein the bonus range is reset when restarting the vehicle if the temperature of the high-voltage accumulator is lower during the restart than during a previous switching off of the vehicle.

7. An electronic control unit for an electrified motor vehicle having a display unit for displaying at least one residual range and a high-voltage accumulator, wherein the electronic control unit is configured to:

determine an expected minimum range based on a state of charge of the high-voltage accumulator, and determine a temperature-dependent bonus range based on a temperature of the high-voltage accumulator and the state of charge of the high-voltage accumulator, wherein the bonus range is determined as an addition to the minimum range, and wherein the bonus range is displayed instead of the minimum range if the minimum range has fallen to zero.

* * * * *